United States Patent

[11] 3,609,513

| [72] | Inventors | Louis J. Raver Anderson;<br>Robert J. Nowakowski, Indianpolis, both of Ind. |
|---|---|---|
| [21] | Appl. No. | 52,024 |
| [22] | Filed | July 2, 1970 |
| [45] | Patented | Sept. 28, 1971 |
| [73] | Assignee | General Motors Corporation<br>Detroit, Mich. |

[54] GENERATOR VOLTAGE REGULATOR WITH INITIAL EXCITATION MEANS
4 Claims, 1 Drawing Fig.

[52] U.S. Cl. .................................................. 322/28,
322/60, 322/73, 322/88
[51] Int. Cl. ..................................................... H02p 9/08,
H02p 9/30
[50] Field of Search........................................... 322/28, 59,
60, 73, 88; 320/64, 67

[56] References Cited
UNITED STATES PATENTS

| 3,427,529 | 2/1969 | Cummins et al. ............. | 322/28 X |
| 3,518,529 | 6/1970 | Pratt............................. | 322/88 X |

*Primary Examiner*—Benjamin Dobeck
*Assistant Examiner*—H. Huberfeld
*Attorneys*—E. W. Christen and C. R. Meland

ABSTRACT: A voltage regulator for regulating the output voltage of a diode-rectified alternating current generator which is used to supply the electrical loads on a motor vehicle including charging the battery. The voltage regulator includes a field energizing bridge circuit comprised of controlled rectifiers and diodes having direct current output terminals connected with the field winding of the generator. The conduction of the controlled rectifiers is controlled by a voltage sensing circuit coupled with the gates of the controlled rectifiers and sensing the output voltage of a power bridge rectifier. A resistor is connected between one direct current output terminal of the field energizing bridge circuit and one side of the battery and this resistor provides part of a circuit for initially forward biasing the controlled rectifiers of the field energizing bridge by battery voltage.

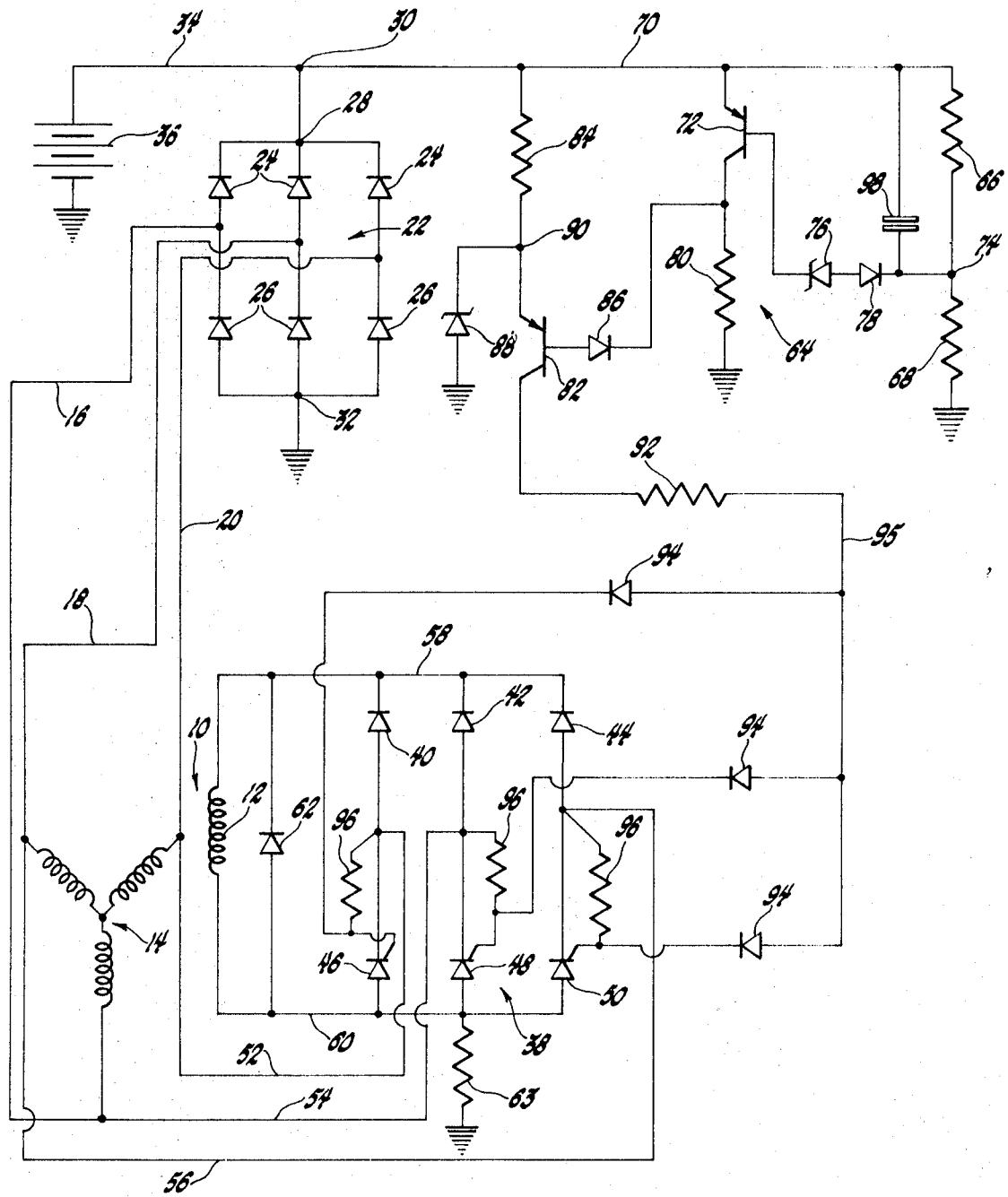

GENERATOR VOLTAGE REGULATOR WITH INITIAL EXCITATION MEANS

This invention relates to a voltage regulator for a diode-rectified alternating current generator and more particularly to a controlled rectifier type of voltage regulator which controls the current supplied to the field winding of the generator as a function of the output voltage of the generator.

Controlled rectifier voltage regulators for diode-rectified alternating current generators used in motor vehicle battery charging systems are well known. Typical examples of this type of system are disclosed in the patents to Kirk et al., 3,343,059 and to Korda 3,230,442.

In contrast to these known types of controlled rectifier voltage regulators it is an object of this invention to provide a controlled rectifier regulator with a voltage sensing and control arrangement that does not require oscillators and transformers and an arrangement where the field winding is energized from a full-wave bridge circuit and further wherein the system is arranged such that the controlled rectifiers are initially biased to a conductive condition by the battery to ensure rapid buildup in voltage of the generator when the engine is started to drive the generator. These objects are accomplished in a system that is completely static or in other words in a system where no switch contacts are required for disconnecting the regulator from the diode-rectified alternating current generator or from the battery.

Another object of this invention is to provide a controlled rectifier voltage regulator for a generator where the field of the generator is supplied direct current from a bridge circuit comprised of controlled rectifiers and diodes and wherein a resistor is connected between one side of the battery of the system and one direct current output terminal of the field energizing bridge to provide part of a circuit for initially gating the controlled rectifiers conductive from the battery when the system is shut down.

IN THE DRAWING

The single figure drawing is a schematic circuit diagram of a voltage regulating system made in accordance with this invention.

Referring now to the drawing, a motor vehicle electrical system is illustrated wherein the reference numeral 10 designates an alternating current generator which has a field winding 12 and a three-phase Y-connected output winding 14. The generator 10 has a rotor which is not illustrated that is driven by the engine of a motor vehicle. The output winding 14 is connected with conductors 16, 18 and 20 which in turn are connected to the AC input terminals of a three-phase full-wave power bridge rectifier designated by reference numeral 22. This power bridge rectifier is comprised of three positive silicon diodes 24 and three negative silicon diodes 26. The positive direct current output terminal 28 of the bridge rectifier 22 is connected with the junction 30 while the negative direct current output terminal 32 of the power bridge rectifier is grounded. The junction 30 is connected with a conductor 34 which supplies charging current to a storage battery designated by reference numeral 36. The positive side of the storage battery is connected to conductor 34 while the negative side of this battery is grounded as shown.

The voltage regulating system of this invention includes a field energizing bridge circuit generally indicated by reference number 38. This bridge circuit is comprised of three silicon diodes 40, 42 and 44 and three controlled rectifiers 46, 48 and 50. It is seen that the diodes and the controlled rectifiers are connected in a three-phase full-wave bridge configuration and that the AC input terminals of this bridge are connected respectively with conductors 52, 54 and 56 energized by the output winding 14 of the generator. The conductor 58 connected with the cathodes of diodes 40-44 forms one direct current output terminal for the bridge 38 while the conductor 60 connected with the anodes of controlled rectifiers 46-50 forms the other direct current output terminal for the bridge 38. It is seen that the field winding 12 is connected directly across conductors 58 and 60 and therefore will be energized when the controlled rectifiers are gated conductive. A field discharge diode 62 is connected across the field winding 12. A resistor 63 is connected between conductor 60 and ground. The purpose of this resistor is to provide part of a circuit for initially biasing controlled rectifiers 46-50 conductive from battery 36 as is more fully described hereinafter.

The conduction of controlled rectifiers 46, 48 and 50 is controlled as a function of the output voltage of the generator To this end a voltage sensing and gate triggering circuit generally designated by reference numeral 64 is provided. This voltage sensing and gate triggering circuit includes a voltage divider comprised of resistors 66 and 68. The voltage divider is connected between conductor 70 and ground and therefore senses the voltage appearing between junction 30 and ground which is substantially the voltage applied to the battery 36 for charging the battery. The system maintains this voltage substantially constant with changes in electrical load and changes in speed of the engine on a motor vehicle that drives the generator.

The voltage divider comprised of resistors 66 and 68 controls the conduction of a PNP transistor 72 having an emitter connected to conductor 70. The base of transistor 72 is connected with junction 74 on the voltage divider through a Zener diode 76 and a forward biased silicon diode 78. A resistor 80 is connected between the collector of transistor 72 and ground.

The circuit 64 includes another PNP transistor 82 having its emitter connected to conductor 70 by a resistor 84. The base of transistor 82 is connected to the collector of transistor 72 by a diode 86. A Zener diode 88 is connected between junction 90 and ground.

The emitter-collector circuit of transistor 82 controls the application of gate signals to the gates of controlled rectifiers 46, 48 and 50. To this end the collector of transistor 82 is connected in series with a resistor 92 the opposite side of this resistor being connected respectively with the anodes of diodes 94 by a conductor 95. The cathodes of diodes 94 are connected respectively with the gate electrodes of controlled rectifiers 46-50 and a resistor 96 is connected across each gate and cathode of a respective controlled rectifier. These resistors 96 can be built into the controlled rectifiers 46-50 or may be external resistors and each resistor may have a resistance of approximately 100 ohms. The resistors 96 provide more stable operation of the controlled rectifiers by providing a constant resistance path between the gate and cathode of each controlled rectifier. The diodes 94 provide gate signal isolation in the system.

The operation of the voltage regulating system will now be described. It will be apparent that the output voltage of the generator is sensed by the voltage divider comprised of resistors 66 and 68 and that the voltage at junction 74 will vary as a function of the output voltage of the generator. When the output voltage of the bridge rectifier 22 is below a desired regulated value transistor 72 is biased nonconductive in its emitter-collector circuit. This means that the voltage at the collector of transistor 72 will be at a low value with the result that the emitter-base circuit of transistor 82 will be forward biased causing transistor 82 to become conductive in its emitter-collector circuit. This base circuit for transistor 82 is through resistor 84, the emitter-base function of transistor 82, diode 86 and then through resistor 80 to ground. With transistor 82 conductive in its emitter-collector circuit a positive voltage will be applied to the gates of controlled rectifiers 46, 68 and 50 to bias these controlled rectifiers conductive. This gate circuit can be traced from conductor 70, through resistor 84, through the emitter-collector circuit of transistor 82, through resistor 92 and then through diodes 94 to the gates of controlled rectifiers 46-50.

When controlled rectifiers 46, 48 and 50 are biased conductive direct current will be supplied to the field winding 12 by conductors 58 and 60 since the bridge circuit 38 now operates as a three-phase full-wave bridge rectifier. As field current is supplied to field winding 12 the generator output voltage increases with the result that the voltage of junction 74 increases. When the output voltage of the generator reaches a predetermined value the transistor 72 becomes biased fully conductive. This raises the voltage of the collector of transistor 72 to such a value that the transistor 82 is biased nonconductive to therefore terminate the supply of gate signals to the gates of controlled rectifiers 46-50. When this happens the controlled rectifiers will be biased nonconductive and are commutated off by the alternating current from the output winding 14. The field winding 12 is now substantially deenergized so that the output voltage of the generator drops and the cycle described repeats itself when transistor 72 becomes nonconductive and transistor 82 conductive. In other words, the controlled rectifiers 46-50 are continuously switched on and off to maintain a substantially constant voltage between junction 30 and ground.

It will be observed that the system that has been described is completely static in the sense that the battery 36 is permanently connected with the bridge rectifier 22 and with all of the components of the voltage regulating system. The system is arranged, however, such that the voltage of battery 36 aids in causing the output voltage of the generator to build up when the rotor of the generator is initially driven by an engine from a shut down condition. To pursue this further it will be observed that when only battery voltage (which is lower than the desired regulated voltage) is applied to the voltage divider 66 and 68 the transistor 73 is biased nonconductive and the transistor 82 will be biased conductive. This will be the normal condition even when the entire system is shut down. With transistor 82 conductive a forward bias will be applied to the gate-cathode circuits of the controlled rectifiers 46-50. This circuit can be traced from the positive side of battery 36, through conductors 34 and 70, through resistor 84, through the emitter-collector circuit of transistor 82, through resistor 92, through diodes 94 to the gate electrodes of controlled rectifiers 46-50, through the parallel circuits of the resistors 96 and the gate-cathode circuits of controlled rectifiers 46-50, through diodes 40, 42 and 44, through conductor 58, through field winding 12, and then through resistor 63 to ground and therefore to the negative side of battery 36. The current flow through this path is limited by resistor 63 and other resistors in he circuit path described so that there is very little drain on battery 36 during the shut down condition of the system. It will appreciated, however, that some small gate current flows and that this current path initially biases the controlled rectifiers 46, 48 and 50 conductive. At this time there is no forward bias on the anode-cathode circuits of controlled rectifiers 46, 48 and 50 but when the output winding 14 begins to develop an output voltage as when its voltage is building up, the anode-cathode circuits of the controlled rectifiers will be forward biased and readily conduct to provide further initial energizing current to the field winding 12 and therefore further enhance the voltage buildup of the generator. It should be pointed out that the magnetic parts of the generator 10 have a certain amount of magnetic retentivity so that the generator will be aided in its build up by residual magnetism. The forward biasing circuit for the controlled rectifiers, including resistor 63, aids in causing a buildup of the output voltage of the generator and this is further aided by the small current supplied by battery 36 that passes through the field winding 12 when the system is initially started. It will be observed that this voltage buildup arrangement is completely static and that no switches are required to connect and disconnect the battery 36 from the system.

The purpose of the Zener diode 88 and resistor 82 is to provide protection from large positive transient voltage pulses. When a transient voltage pulse occurs on line 70 the transistor 82 is protected by clamping the voltage applied to its emitter to the value of the break down voltage of Zener diode 88 and the power of this pulse is dissipated in resistor 84 and Zener diode 88. Damage to transistor 72 from transient voltages is prevented by the provision of the blocking diode 86 connected to the collector of the transistor 72.

It will be apparent to those skilled in the art that the voltage buildup feature of this invention, including resistor 63, could be utilized with types of voltage sensing and gate firing circuits other than the one disclosed herein. As one example, the circuit 64 could be modified to include a control transistor having its collector-emitter circuit connected between conductor 95 and ground rather than utilizing a transistor such as transistor 82 which is connected in series with conductor 95. In such a modified system gate signals would be shunted to ground when the control transistor was conductive and gate signals would be applied to the gate of the controlled rectifiers when the control transistor was nonconductive. The conduction of the transistor could be controlled by the same type of circuit as voltage divider 66 and 68 and Zener diode 76 and forward biased diode 78. In such a modified arrangement the conductor 95 would be connected to conductor 70 through a resistor with the collector-emitter circuit of the control transistor connected between conductor 95 and ground and with the base of this circuit controlled by a voltage divider-Zener diode combination. This modified gate firing arrangement is like the one shown in the above mentioned patent to Korda 3,230,442. It therefore will be appreciated that the voltage sensing circuit and gate firing circuit can take various configurations and still be utilized with the voltage buildup circuit including resistor 63 of this invention.

The purpose of the forward biased silicon diode 78 is to provide temperature compensation for the varying break down voltage of Zener diode 76 during variable temperature conditions of operation of the voltage regulating system.

The capacitor 98 connected across resistor 66 operates as a filter capacitor for the voltage applied to Zener diode 76.

The voltage regulating system that has been described is intended for use on motor vehicle systems where the rotor of the generator 10 is driven by the prime mover of the vehicle and where the prime mover operates at varying speeds. In this type of system the power bridge rectifier 22 not only supplies current for charging the battery but also supplies other direct current loads on the vehicle which have not been illustrated.

What is claimed is:

1. An electrical system comprising, an alternating current generator having a polyphase output winding and a field winding, a polyphase full-wave power bridge rectifier having AC input terminals connected with said output winding and direct current output terminals, a battery, means electrically connecting said battery with the direct current output terminals of said power bridge rectifier whereby said power bridge rectifier supplies charging current to said battery, a field energizing bridge circuit comprised of a plurality of diodes and a plurality of controlled rectifiers, said field energizing bridge circuit having AC input terminals connected between respective diodes and controlled rectifiers and connected with said output winding of said generator, means connecting said field winding directly across the direct current output terminals of said field energizing bridge, a control circuit operative to control the application of direct current from one terminal of said power bridge rectifier to the gate electrodes of said controlled rectifiers as a function of the output voltage of said generator whereby field current is controlled to maintain a substantially constant output voltage from said generator, and a resistor connected between one of said direct current output terminals of said field energizing bridge circuit and one side of said battery, said resistor forming part of a circuit for providing an initial forward bias to the gate cathode circuits of said controlled rectifiers from said battery to thereby enhance voltage build up of said generator when said system is started up from an at rest condition, said circuit including the diodes of said field energizing bridge and said field winding.

2. The electrical system according to claim 1 where a resistor is connected across the gate and cathode of each controlled rectifier.

3. The electrical system according to claim 1 where the gate electrodes of the controlled rectifiers are coupled to one side of said battery and power bridge rectifier by a transistor which is biased conductive during a shut down condition of said system, said transistor being controlled by a voltage responsive circuit connected across said power bridge rectifier and battery.

4. A battery charging system for a motor vehicle comprising, a polyphase alternating current generator having a three-phase output winding and a field winding, said generator being adapted to be driven by a prime mover of said vehicle, a three-phase full-wave power bridge rectifier having AC input terminals connected with said three-phase output winding, said power bridge rectifier having direct current output terminals connected with first and second load conductor means, a battery, means connecting said battery directly across said first and second load conductor means whereby said power bridge rectifier supplies charging current to said battery, a field energizing bridge circuit comprised of three diodes and three controlled rectifiers, said field energizing bridge circuit having AC input terminals connected between a respective diode and controlled rectifier which are connected with said three-phase output winding of said generator, means connecting said field winding across the direct current output terminals of said field energizing bridge, a voltage sensing and gate firing control circuit coupled with the gate of said controlled rectifiers and with said load conductor means to sense the output voltage of said power bridge rectifier, said circuit controlling the application of gate signals to said gate electrodes of said controlled rectifiers to thereby control the current applied to said field winding from the direct current output terminals of said field energizing bridge as a function of the output voltage of said generator, and a resistor connected between one direct current output terminal of said field energizing bridge and one of said load conductors, said resistor forming part of a conductive path for initially biasing said controlled rectifiers to a conductive condition from said battery, said conductive path including the gate and cathode of said controlled rectifiers, said diodes of said field energizing bridge, said field winding and said resistor.